(12) United States Patent
Vaisanen

(10) Patent No.: US 6,870,839 B1
(45) Date of Patent: Mar. 22, 2005

(54) CROSS-CONNECTING SUB-TIME SLOT DATA RATES

(75) Inventor: Pasi Vaisanen, Victoria (AU)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/400,645

(22) Filed: Sep. 21, 1999

(30) Foreign Application Priority Data

Jul. 30, 1999 (AU) .............................................. PQ1933

(51) Int. Cl.[7] .............................................. H04Q 11/04
(52) U.S. Cl. .................................... 370/376; 370/498
(58) Field of Search ............................... 370/376, 358, 370/362, 363, 369, 370, 372, 375, 378, 391, 394, 468

(56) References Cited

U.S. PATENT DOCUMENTS

| | | | | |
|---|---|---|---|---|
| 3,758,722 A | * | 9/1973 | Bonyhard | 370/376 |
| 3,903,370 A | * | 9/1975 | Carbrey et al. | 370/363 |
| 3,941,947 A | * | 3/1976 | Jacob et al. | 370/369 |
| 5,005,171 A | * | 4/1991 | Modisette et al. | 370/522 |
| 5,410,300 A | * | 4/1995 | Gould et al. | 340/2.2 |
| 5,430,723 A | * | 7/1995 | Nakaide et al. | 370/378 |
| 5,434,850 A | * | 7/1995 | Fielding et al. | 370/321 |
| 5,754,544 A | * | 5/1998 | Pfeiffer | 370/359 |
| 5,757,793 A | * | 5/1998 | Read et al. | 370/358 |
| 5,956,324 A | * | 9/1999 | Engdahl et al. | 370/242 |
| 6,363,070 B1 | * | 3/2002 | Mullens et al. | 370/389 |
| 6,426,951 B1 | * | 7/2002 | Antonsson et al. | 370/358 |

\* cited by examiner

*Primary Examiner*—Huy D. Vu
*Assistant Examiner*—Daniel Ryman
(74) *Attorney, Agent, or Firm*—Squire, Sanders & Dempsey L.L.P.

(57) ABSTRACT

A cross-connect is provided which uses "mask" and "rotate" parameters, rather than "source" and "destination" parameters. In a first step (1300), a word representing a full time slot of data is read from a desired source time slot. In a following step (1302), the aforementioned word is masked to enable only the desired bits which are to be output. Thereafter, in a step (1304), the masked word is rotated to ensure that the target bits are in the correct bit positions for a target time slot, to which the masked and rotated word is written in a step (1306). This cross-connection method supports efficient use of cross-connection control memory, and of buffer RAM memory.

18 Claims, 20 Drawing Sheets

CROSS-CONNECTING SUB-TIME SLOT DATA RATES

TECHNICAL FIELD OF THE INVENTION

The present invention relates generally to the field of telecommunications switching, and, in particular, to the aspect of cross-connecting sub-time slot data rates in a digital cross-connect. The present invention thus relates to a method and apparatus for cross-connecting sub-time slot data rates.

BACKGROUND ART

In the context of this specification, the term "sub-rate" means either a sub-set of bits in a time slot, or alternatively, refers to the associated data rate which corresponds to the aforementioned sub-set of bits being transmitted on a data bus. The particular meaning to be adopted will be clear from the context in which the term is used.

Typical digital cross-connection equipment provides for cross-connection from high speed input data buses to high speed output data buses and/or to lower speed output data buses. The high speed data buses are typically multi-master buses or point-to-point buses. The cross-connection operation can be performed either directly, or typically via buffering RAM. Cross-connection is generally performed at the system bus width or granularity. Thus, an incoming data bus having a data rate of M bits per second typically has a bus "width" N bits wide. The cross-connection function can cross-connect the input bus running at M bits per second to an output bus running at m bits per second (where m is less than M). The output bus and the input bus are typically both N bits wide. The width of the output data bus can however be smaller (eg. n bits wide, where n is less than N), this finer granularity requiring more control lines to the cross-connect. Free cross-connectability can be achieved from any incoming bit on the incoming bus to any outgoing bit on the outgoing bus, but this results in poor efficiency in control memory, particularly if most cross-connections are to be performed at the aforementioned system granularity, ie. N bits wide.

Two typical cross-connect architectures have been adopted. In the first architecture, all data in the high capacity input bus is stored in a buffering RAM, from which it is thereafter cross-connected into output buses. Alternatively, data may be directly cross-connected from the input bus, and thereafter written into buffer RAM. Both of these architectures have disadvantages.

When the entire content of the high speed input bus is buffered before cross-=connection, storage capacity is inefficiently utilised, since all data is stored, but not all data will be used, ie. cross-connected. This approach results in wasted silicon area if cross-connection apparatus is implemented in monolithic integrated circuits. This inefficiency is particularly noticeable as the difference in speed, ie. the bit-rate between input and output buses increases.

The second architecture, which performs cross-connection directly from the input bus, makes use of less buffering memory, providing a solution to the memory inefficiency previously described. This second architecture, however, requires several cross-connections for connecting the entire N bit word, and thus the cross-connection state-machine typically runs at a clock rate which can be up to N times faster than the input bus.

DISCLOSURE OF THE INVENTION

It is an object of the present invention to substantially overcome, or at least ameliorate, one or more disadvantages of existing arrangements.

According to a first aspect of the invention, there is provided a method of cross-connecting a first sub-rate of a time slot in an input bus to a second sub-rate of a corresponding time slot in an output bus, the method comprising the steps of:

masking time slot bits in the input bus using a mask sub-rate field to form a first set of bits which correspond to the first sub-rate;

rotating the first set of bits using a rotation field to form a second set of bits conformed to the second sub-rate; and cross-connecting the second set of bits to the corresponding time slot in the output bus.

According to another aspect of the invention, there is provided a method of cross-connecting a first sub-rate of a time slot in an input bus to a second sub-rate of a corresponding time slot in an output bus, the method comprising the steps of:

rotating the bits of the time slot in the input bus with a rotation field;

masking a first set of bits corresponding to the first sub-rate of the rotated time slot with a sub-rate mask field to give a second set of bits corresponding to the second sub-rate; and cross-connecting the second sub-rate set of bits to the corresponding time slot in the output bus.

According to yet another aspect of the invention, there is provided a method of transferring a sub-set of bits from a first position in a first register to a second position in a second register, the method comprising the steps of:

masking bits from the first register using a mask field to form the sub-set of bits;

rotating the sub-set of bits using a rotation field to form a rotated set of bits conformed to the second position; and transferring the rotated set of bits to the second register.

According to another aspect of the invention, there is provided a cross-connect comprising:

masking means adapted to mask time slot bits in an input bus using a mask sub-rate field to form a first set of bits which correspond to a first sub-rate;

rotating means adapted to rotate the first set of bits using a rotation field to form a second set of bits conformed to the second sub-rate; and cross-connecting means adapted to cross-connect the second set of bits to a time slot in an output bus, said time slot corresponding to the input bus time slot.

According to another aspect of the invention, there is provided a cross-connect comprising:

rotating means adapted to rotate the bits of a time slot in an input bus with a rotation field;

masking means adapted to mask a first set of bits corresponding to a first sub-rate of the rotated time slot with a sub-rate mask field to give a second set of bits corresponding to a second sub-rate; and cross-connecting means adapted to cross-connect the second sub-rate set of bits to a corresponding time slot in an output bus.

According to another aspect of the invention, there is provided a cross-connect system including:

input means adapted to receive data disposed in time-slots of frames on an input bus;

output means adapted to transmit cross-connected data disposed in corresponding time-slots of frames on an output bus;

cross-connection control memory means adapted to store coded records which define one or more first sub-rates in the input bus time slots to be cross-connected to one or more second sub-rates in the corresponding time slots in the output bus; and at least one cross-connect adapted to cross-connect the one or more first sub-rates in the input bus to the one or more second sub-rates in the output bus in accordance with the coded records, said cross-connection performed by masking time slot bits in the input bus to form a first set of bits which corresponds to the one or more first sub-rates; rotating the first set of bits to form a second set of bits conformed to the one or more second sub-rates; and cross-connecting the second set of bits to the corresponding timeslot in the output bus.

Embodiments of the present invention thus provide cross-connection of data in terms of "mask" and "rotate" parameters, rather than in "source" and "destination" parameters. This supports efficient cross-connection down to one-bit levels, while making efficient use of cross-connection control memory. Furthermore, cross-connections can often be specified with a single cross-connection line, this being particularly efficient when most cross-connections are performed at the full time slot width. In addition, this solution makes efficient use of buffer RAM memory, and typically does not require circuitry running at high frequency multiples of the high-capacity bus clock.

BRIEF DESCRIPTION OF THE DRAWINGS

A number of preferred embodiments of the present invention will now be described with reference to the drawings, in which.

DETAILED DESCRIPTION INCLUDING BEST MODE

Figure 1:
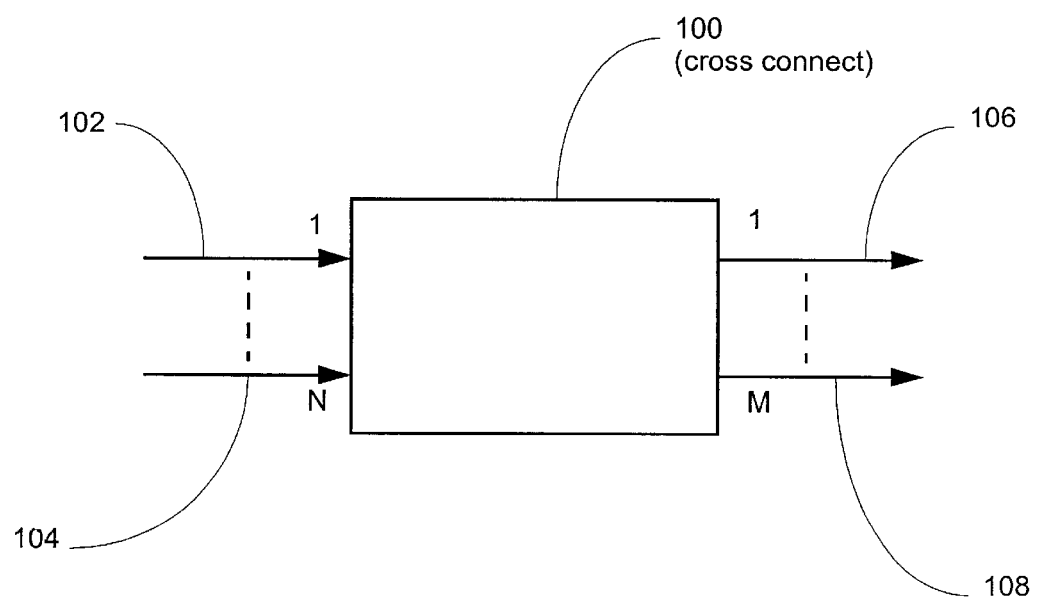
FIG. 1 illustrates basic functionality of a cross-connect in the preferred embodiment.

Where reference is made in any one or more of the accompanying drawings to steps and/or features, which have the same reference numerals, those steps and/or features have for the purposes of this description the same function (s) or operation(s), unless the contrary intention appears.

The description provided below makes use of particular data switching, masking and rotating mechanisms. There are many other variants by which these operations may be performed, without departing from the spirit or scope of the invention. Furthermore, one or more of the steps of the preferred method may be performed in a different sequence, and furthermore may be performed in parallel rather than sequentially.

FIG. 1 depicts a cross-connect 100 having N input buses 102 to 104, and M output buses 106 to 108.

Figure 2:
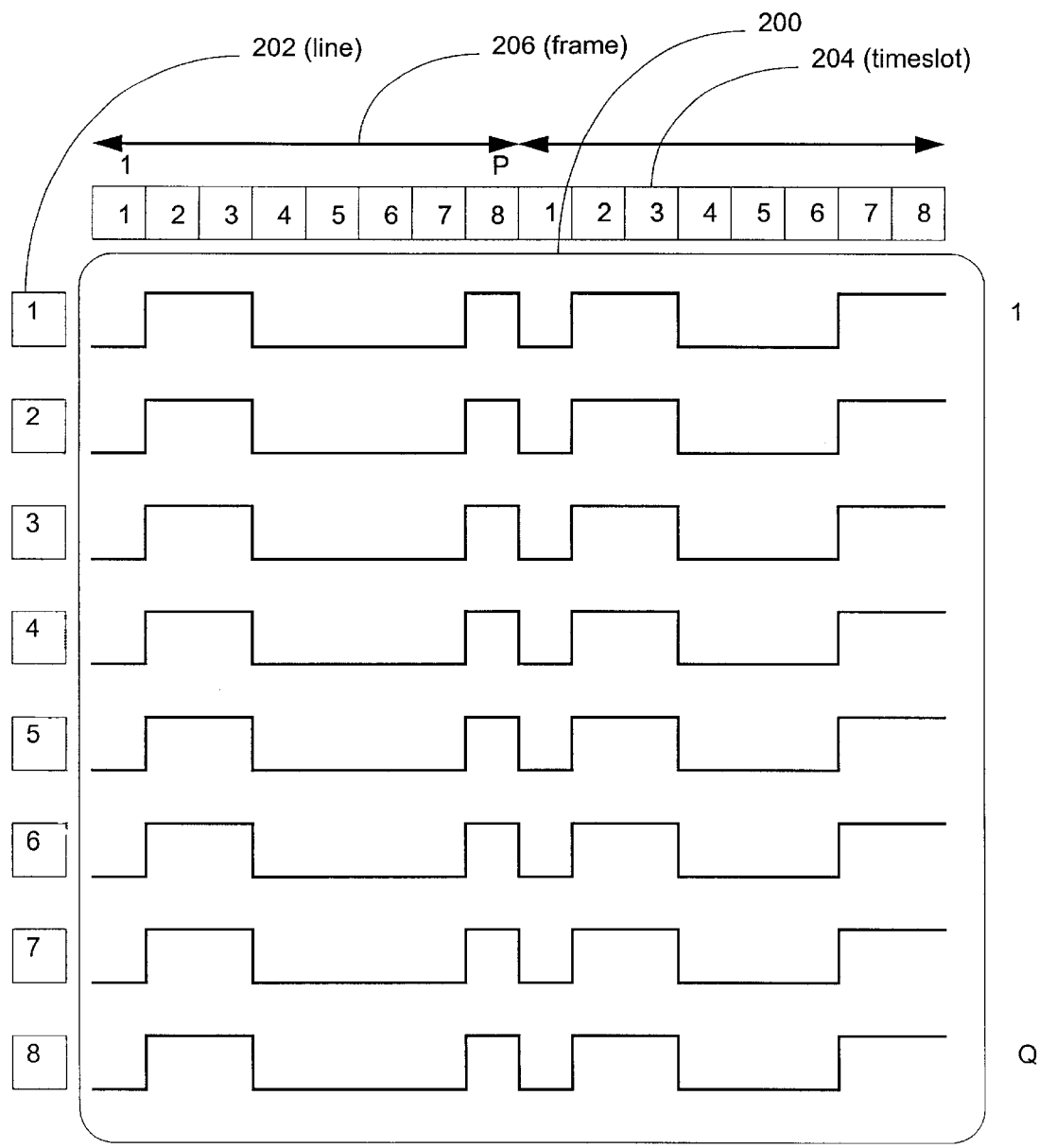
FIG. 2 depicts data on an input bus.

FIG. 2 presents a wavefront perspective of the data on an incoming bus, say 102, to the cross-connect 100. For the sake of illustration the Figure shows a snap shot 200 of the bit waveforms on a bus, where the bus is 8 "lines" wide, as exemplified by line 202. Each frame 206 of the data signal is 8 bits long, and individual time slots 204 are thus 8 bits wide. The various bus widths and frame lengths have been selected to facilitate illustration.

Figure 3:
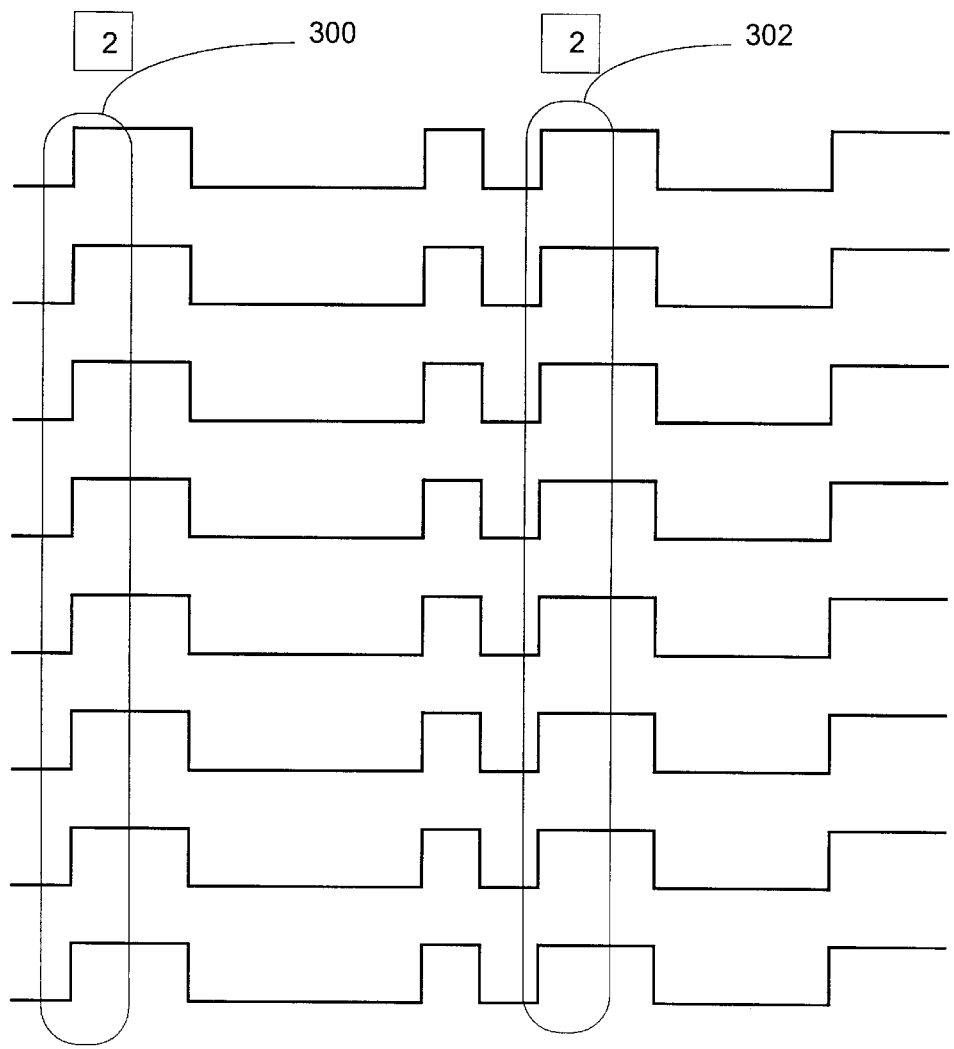
FIG. 3 shows cross-connection at the full system granularity.

FIG. 3 presents a waveform depiction of desired components 300 and 302 to be cross-connected to a desired output bus which is 8 bits wide, but consists only of timeslot 2 per frame as depicted by ovals 300 and 302. The figure shows that in the described cross-connection mode, the input bus, say 102, which contains 8 timeslots per frame and is 8 data lines wide, is cross-connected and de-multiplexed to provide an output bus which is also 8 bits wide, but which contains only the data in timeslot 2 per frame ie. timeslots 300, 302 etc.

Figure 4:
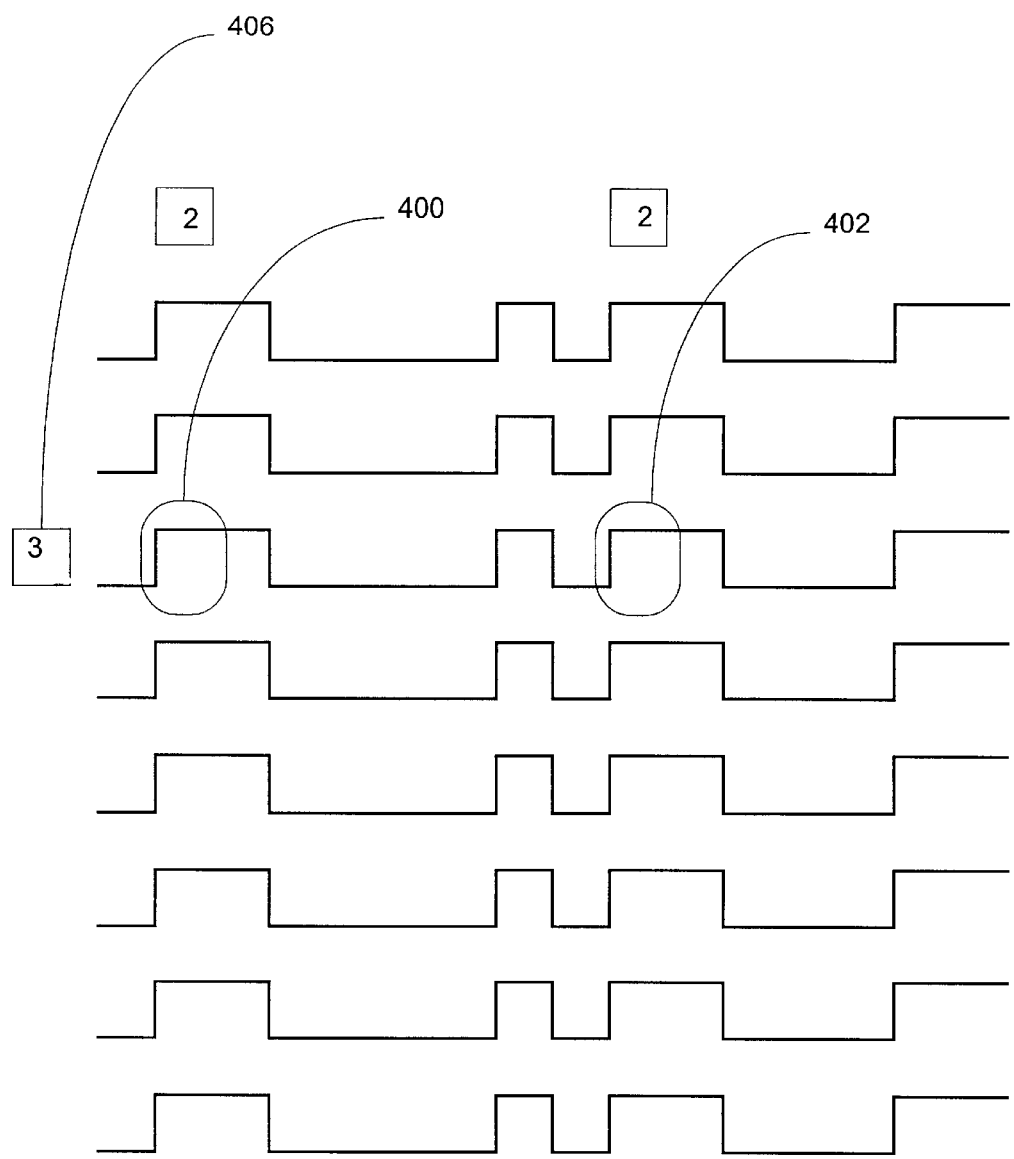
FIG. 4 illustrates de-multiplexed sub-rate cross-connection waveforms.

FIG. 4 presents a waveform depiction of another cross-connection mode. In this Figure, an output bus is only 1 bit wide ie. data line 3 (depicted as 406), and contains only the data in timeslot 2 ie. timeslots 400, 402.

Figure 5:
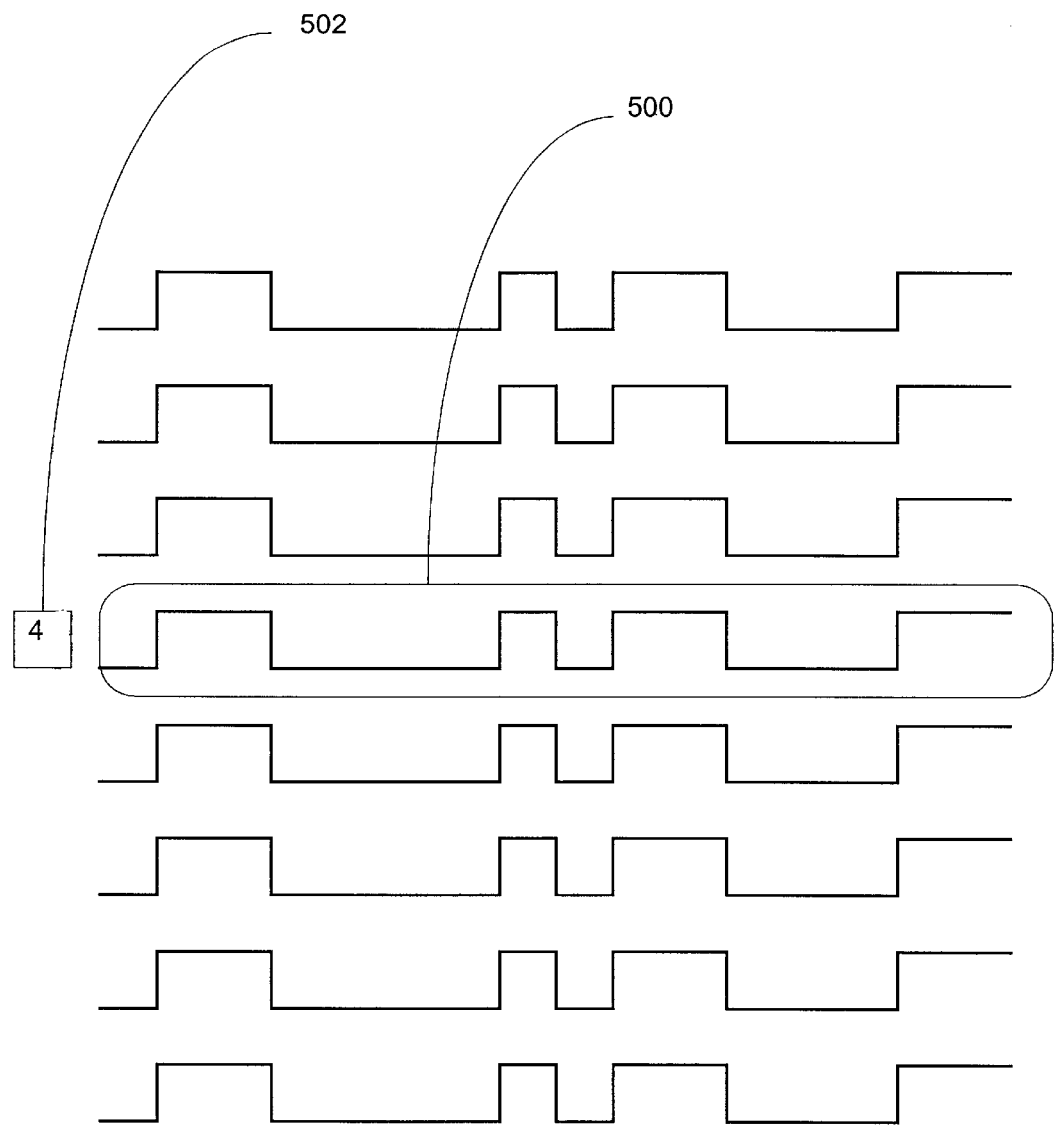
FIG. 5 depicts cross-connection at the full input bus rate, but at 1/N of the input bus width.

FIG. 5 depicts yet another cross-connection mode, where an output bus is to carry data in all eight timeslots per frame (as depicted by 500), but only from a single data line 502.

Figure 6:
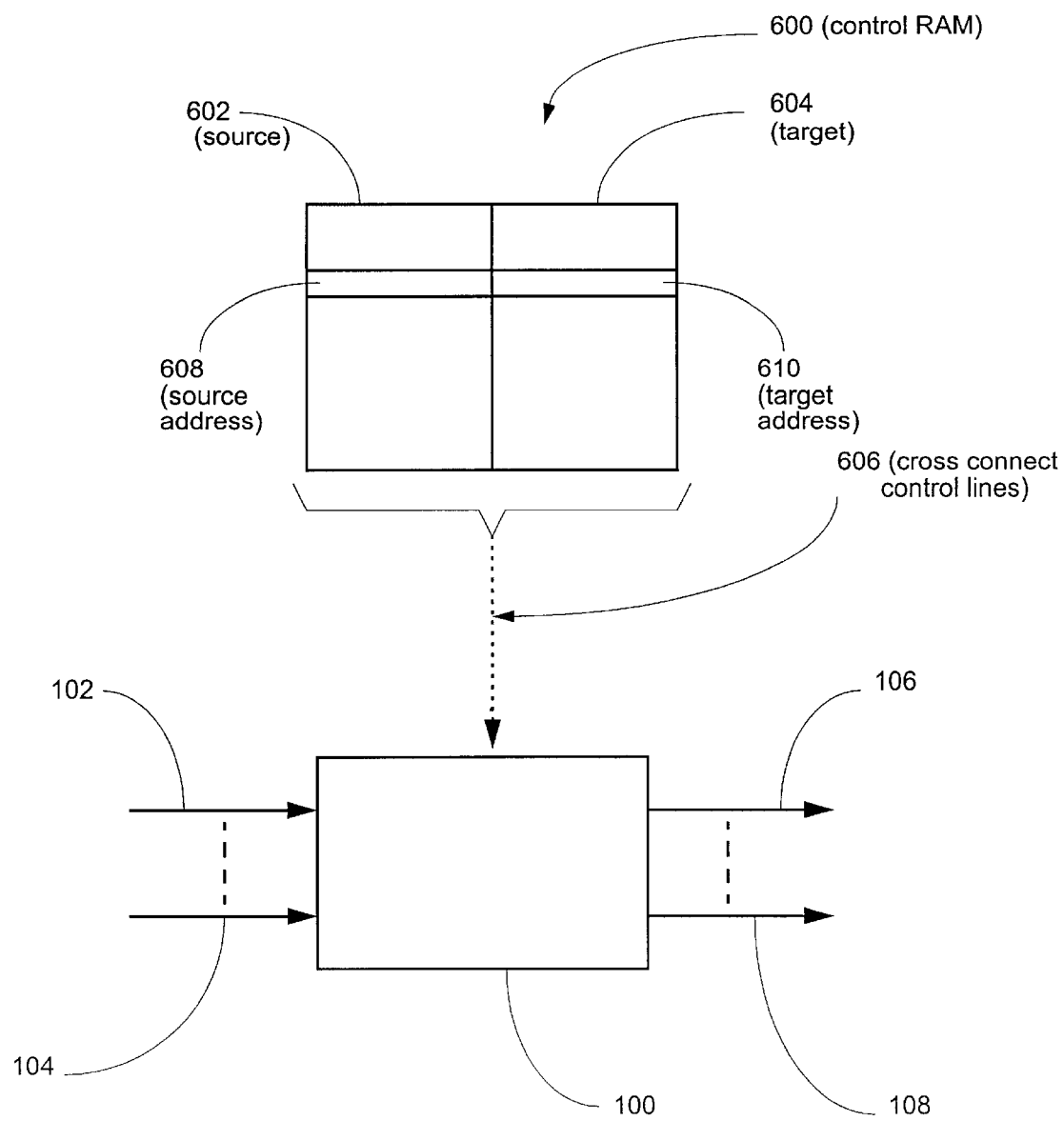
FIG. 6 shows a cross-connect control RAM in the preferred embodiment.

FIG. 6 depicts a control RAM 600, which by means of cross-connect control bus 606, controls the cross-connection between input buses 102 to 104 and output buses 106 to 108 by the cross-connect 100. The control RAM 600 contains a source column 602 and a target column 604 and contains sufficient "rows" to support cross-connection control information for an entire frame of the fastest output bus. A source address entry 608 in the source column 602 defines the frame address of the data from the input buses 102 to 104 which is to be cross-connected. A target address 610 in the target column 604 defines the frame address in the outgoing buses 106 to 108 into which the aforementioned data is to be cross-connected.

Figure 7:
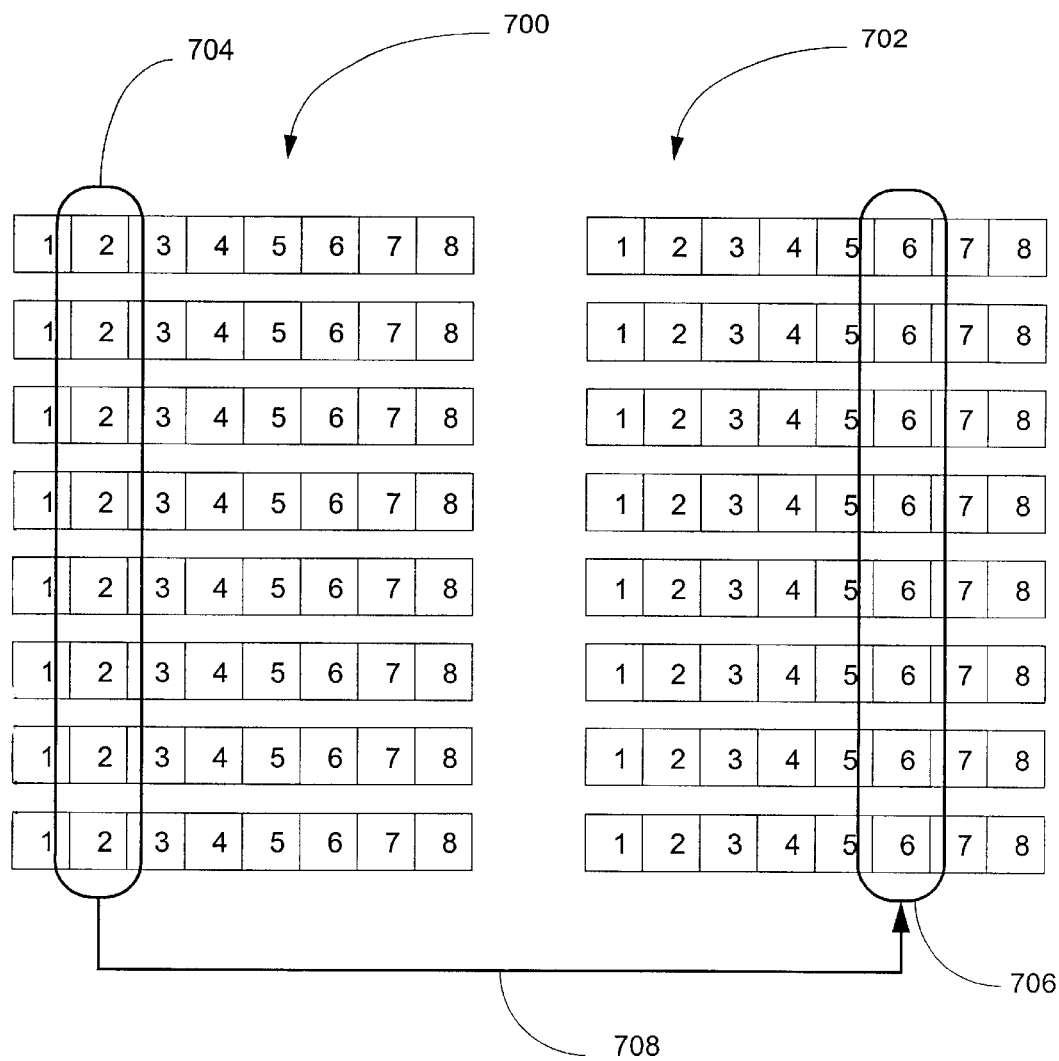
FIG. 7 depicts full-width time slot cross-connection in the preferred embodiment.
Figure 8:
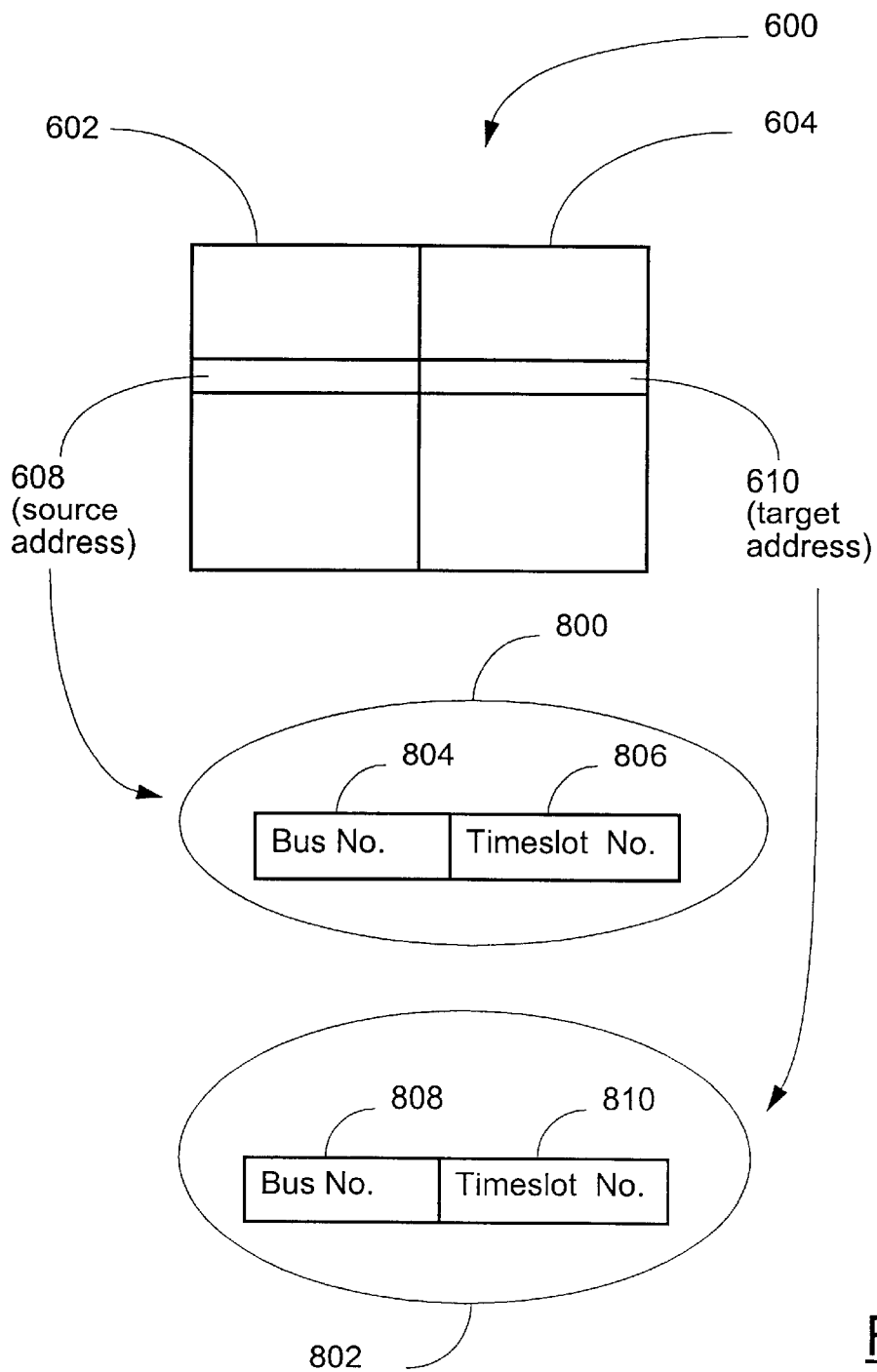
FIG. 8 shows source and target addressing for time-slot cross-connection in the preferred embodiment.

FIG. 7 illustrates a particular example of cross-connection, whereby a full width timeslot 704 in an incoming bus 700 is to be cross-connected to a full width timeslot 706 in an outgoing bus 702, as depicted by an arrow 708. In this case, FIG. 8 shows that the source address 608 in the source column 602 of the cross-connection control RAM 600 has a form shown in the inset 800. The address in the inset is seen to comprise a bus number 804 and a timeslot number 806, these numbers identifying, respectively, the incoming bus 700 and the desired timeslot to be cross-connected 704 (see FIG. 7). Similarly, the target address 610 in the target column 604 of the cross-connect control RAM 600 has the form shown in the inset 802. The target address has a bus number 808, and timeslot number 810 which respectively define the outgoing bus number 702 and the timeslot 706 into which the source data is to be cross-connected (see FIG. 7).

Figure 9:
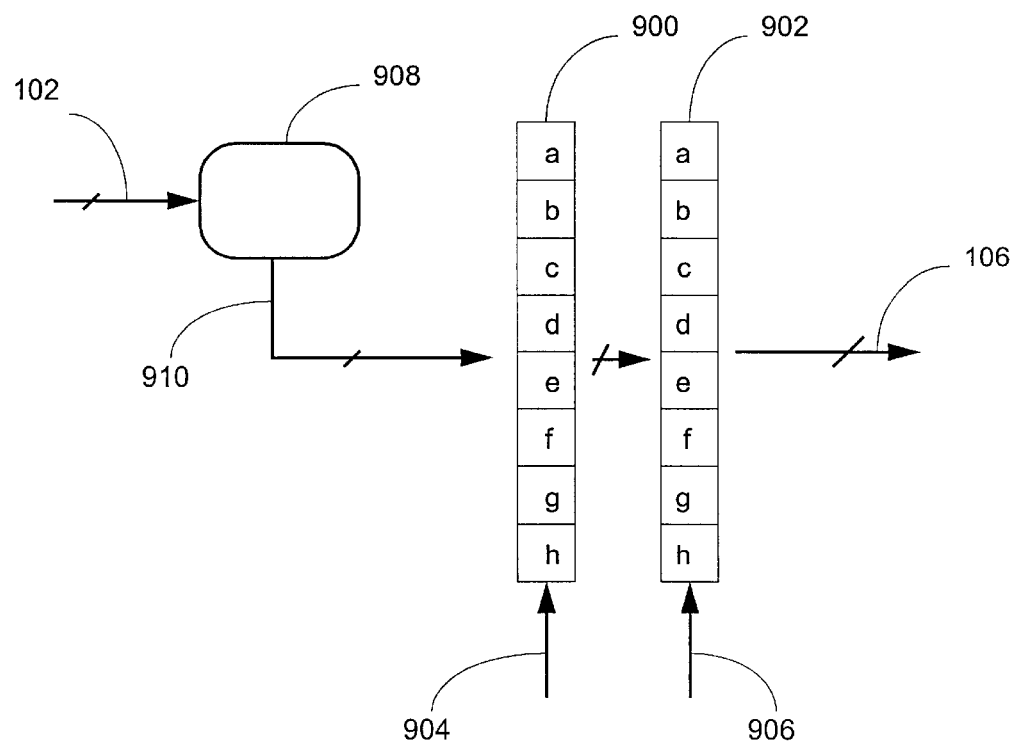
FIG. 9 depicts time-slot cross-connection at the full system data width in the preferred embodiment.

FIG. 9 illustrates how the incoming bus 102 having been switched in its full 8 bit width by switch matrix 908 to outgoing bus 106, is latched into a register 900 under control of a register clock signal 904. The arrows depicting incoming bus 102 and the outgoing bus 106 are cross-hatched to reflect that they are multi-line buses. The contents of the register 900 are clocked into an output register 902 under control of another clock signal 906, the clock signal 906 effecting the necessary timeslot delay required to cross-connect timeslot 704 to timeslot 706 (see FIG. 7). The contents of the register 902 are output on the bus 106 under the control of the clock signal 906.

Figure 10:
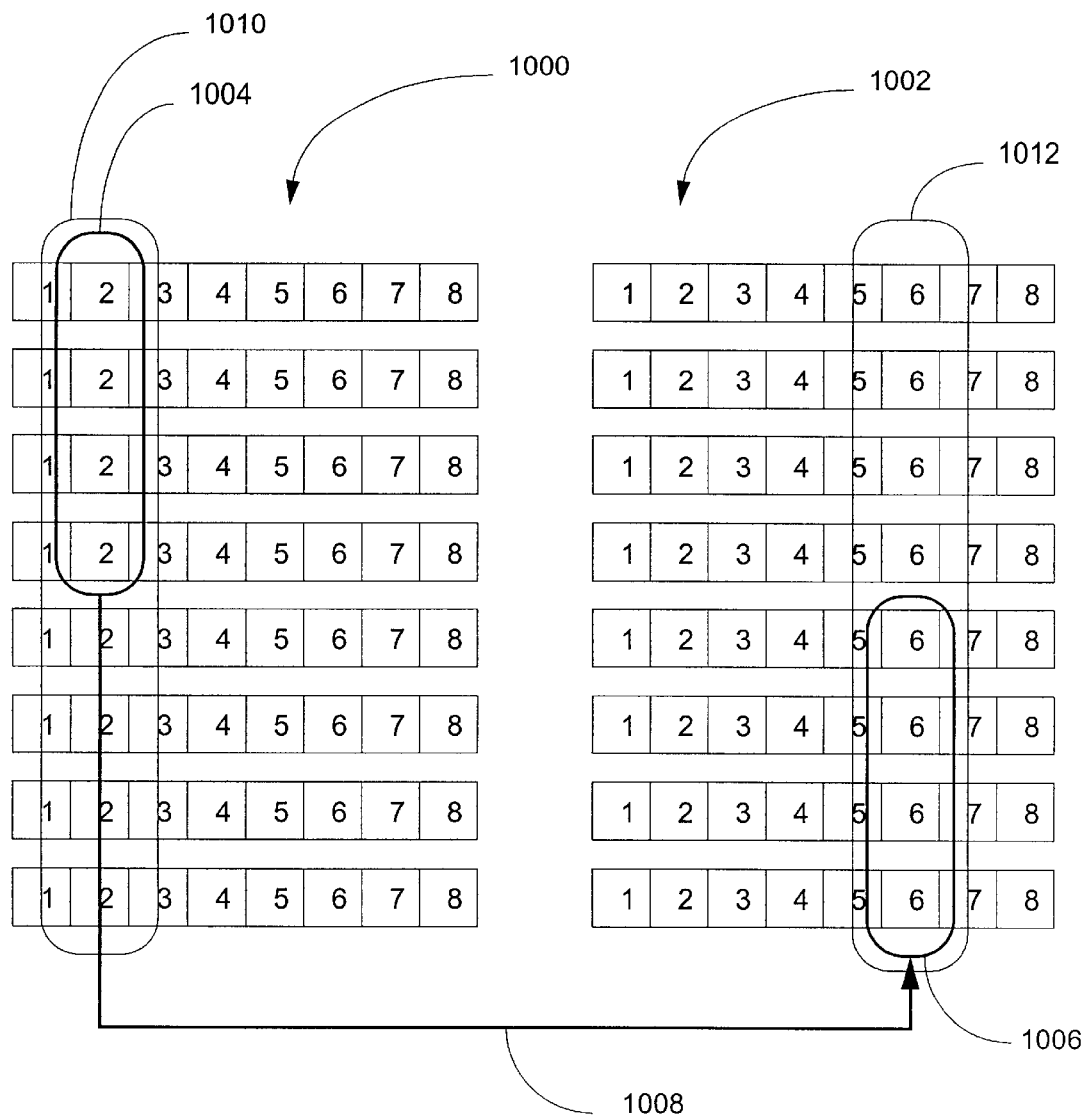
FIG. 10 depicts sub-rate time-slot cross-connection in the preferred embodiment.

FIG. 10 illustrates a different cross-connection mode wherein a sub-rate timeslot 1004 in an incoming bus 1000 is to be cross-connected to a sub-rate timeslot 1006 in an outgoing bus 1002, the cross-connection being depicted by an arrow 1008.

Figure 11:
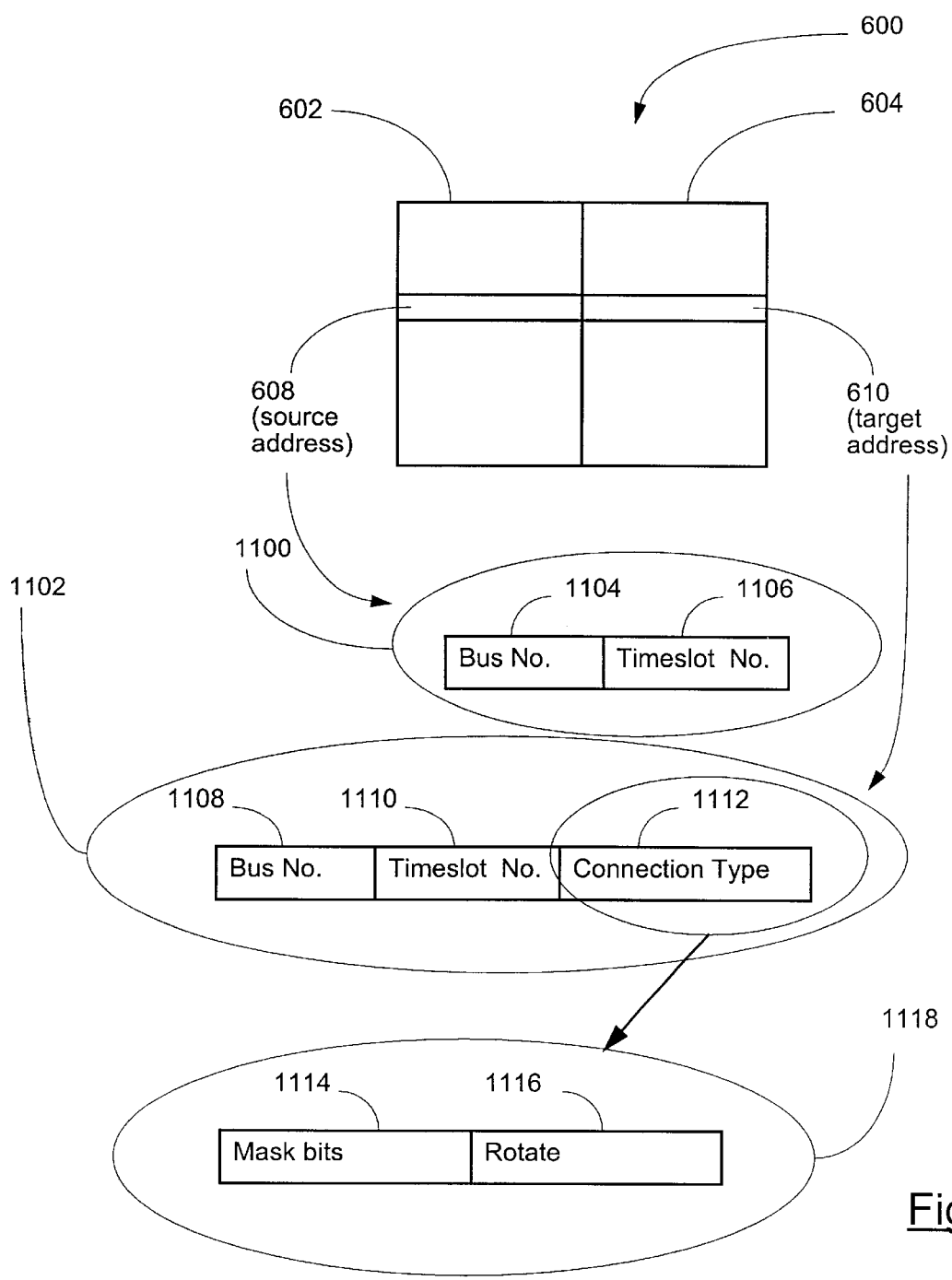
FIG. 11 illustrates source and target addressing for sub-rate cross-connection in the preferred embodiment.

FIG. 11 illustrates the cross-connect control RAM address structures in this case, showing that the source address 608 has the form shown in an inset 1100, having a bus number 1104 and a timeslot number 1106 which, respectively, identify the address of the timeslot 1010 from which the sub-rate timeslot 1004 is to be cross-connected (see FIG. 10). The target address 610 in the target column 604 of the cross-connect control RAM 600 has a form shown in an inset 1102, comprising a bus number 1108, a timeslot 1110, and a connection type 1112. The bus number 1108 and timeslot number 1110 refer, respectively, to the address of the target timeslot 1012 to which the sub-timeslot data 1004 is to be cross-connected. The connection type field 1112 is shown in an inset 1118 to comprise a mask bit field 1114 and a rotate field 1116.

Figure 12:
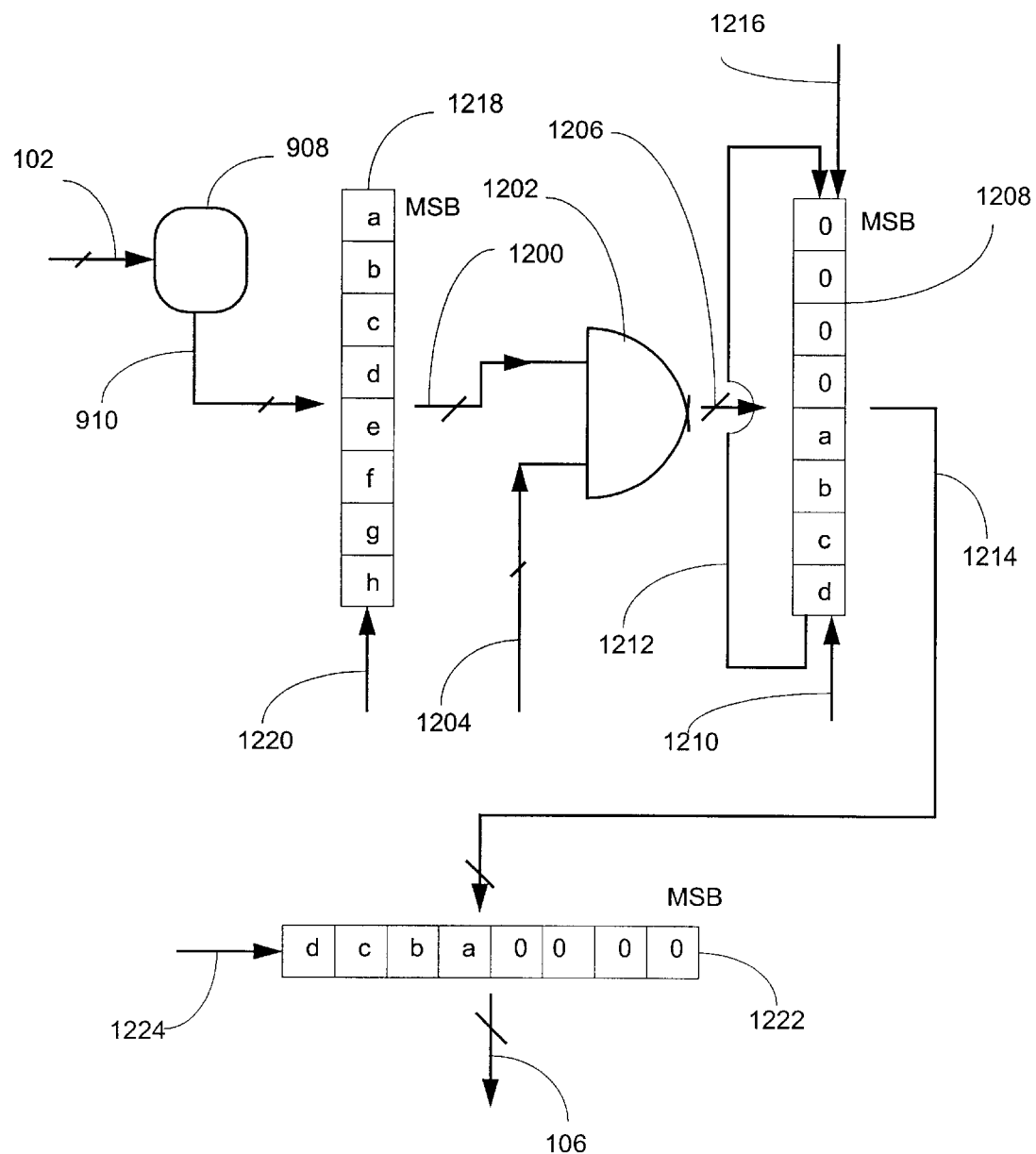
FIG. 12 shows sub-rate time-slot cross-connection in the preferred embodiment.

Turning to FIG. 12, the incoming bus 102 is fed into the switch matrix 908 which switches the incoming bus 102 to the outgoing bus 910, the timeslot 1010 (see FIG. 10) being loaded into the register 1218 under control of the clock signal 1220. The timeslot 1010 in the register 1218 is gated by an AND gate array 1202, the masking being performed under control of a mask control bus 1204. The masking operation enables transmission of the sub-rate timeslot data 1004 (see FIG. 10) by the AND gate array 1202, but disables transmission of data in the timeslot 1010 falling outside the desired sub-timeslot 1004. The masked timeslot data is output from the gate array 1202 on a bus 1206, and input into a register 1208, under control of a clock signal 1210 which provides the required timeslot delay. Thereafter, the data in the register 1208 is rotated, the rotation being effected by a clock signal 1216 and a feedback loop 1212. The data in the register 1208 is rotated to shift it from the incoming sub-time slot position 1004 to the outgoing sub-timeslot position 1006. The effects of the mask and rotate operations can be seen by considering the data in the input register 1218, this data being depicted by the letters a to h, and the data in the output register 1208, the data a to d now being in the lower section of the register 1208, the upper section thereof having been forced to the data value "0". After the mask and rotate operations, the contents of the output register 1208 are output on a bus 1214 to an output register 1222, under the control of a clock signal 1224. The contents of the output register 1222 are then output on the bus 106. Although the present embodiment describes the data on the outgoing bus 106 first being masked by the AND gate array 1202 and then being rotated in the register 1208, it should be appreciated that the rotation operation can be performed prior to the masking operation, without altering the nature of the data output on the bus 106. Therefore, the desired bits designated a, b, c and d in the most significant bit (ie., MSB) position of the register 1218 can first be rotated to the position shown in the register 1208, and thereafter, the first four most significant bits can be masked to produce the zeros as shown in the Figure.

Figure 13:
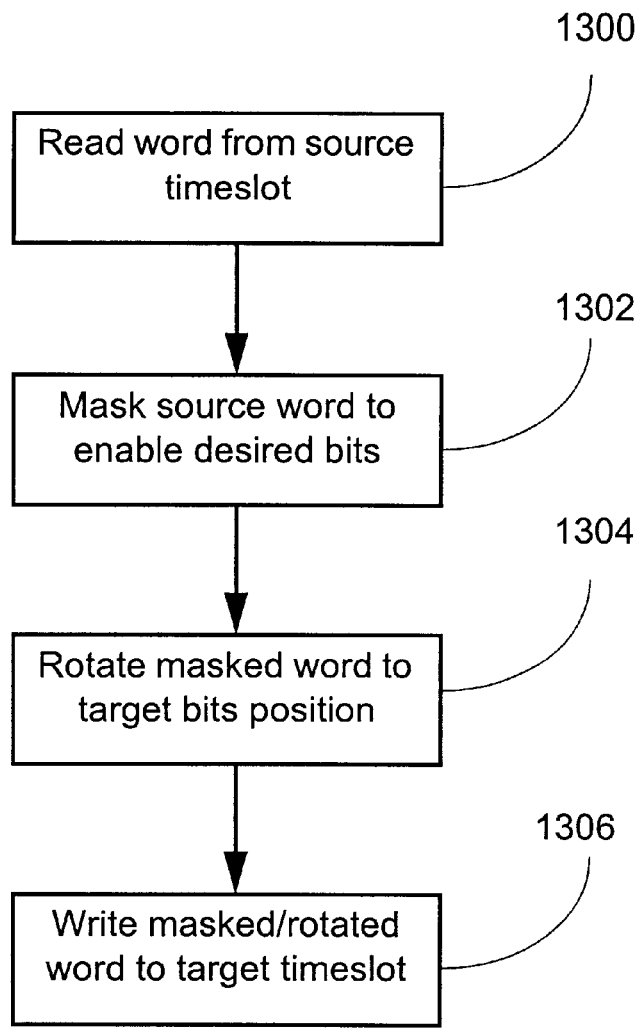
FIG. 13 depicts a process flow description for sub-rate cross-connection in the preferred embodiment.

FIG. 13 depicts a process flow of the mask and rotate operations. In the first instance, in step 1300 a word representing a full timeslot of data is read from a desired source timeslot. Thereafter in step 1302, the aforementioned source word is masked to enable only the desired bits which are to be output. Next, in step 1304 the masked word is rotated to ensure that the target bits are in the correct bit positions, for a target timeslot after which the masked and rotated word is written to the target timeslot in step 1306.

Figure 14:
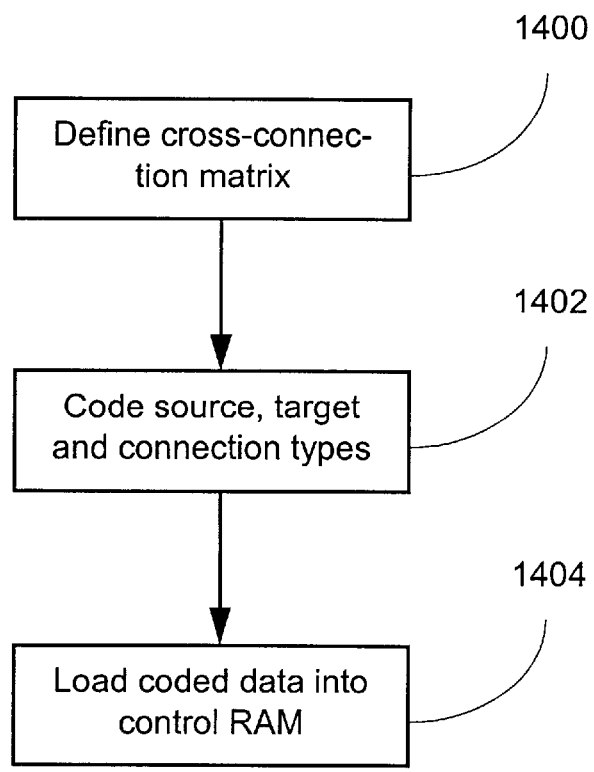
FIG. 14 illustrates a process flow diagram for control RAM data preparation in the preferred embodiment.

FIG. 14 presents a view of a cross-connect operation process flow. In the first instance, a cross-connection matrix is defined in step 1400. The matrix defines the required cross-connections to be performed within a single frame. Reference is made to FIGS. 3 to 5 and FIGS. 7 and 10 for examples of typical cross-connections. Thereafter, in step 1402 the desired cross-connection information is coded into the addressing form depicted in FIG. 8 for full-width timeslot cross-connection and in FIG. 11 for sub-timeslot cross-connection. Thereafter, this coded address data is loaded into a cross-connection control RAM in step 1404. The contents of the cross-connection control RAM, eg. 600 (see FIG. 11) are read one line at a time, each line of the control RAM 600 effecting a desired cross-connection. Typically, the entire contents of the control RAM 600 are read once per frame, and this is repeated for the next frame and so on.

FIGS. 15 to 20 illustrate another embodiment of the inventive concept.

Figure 15:
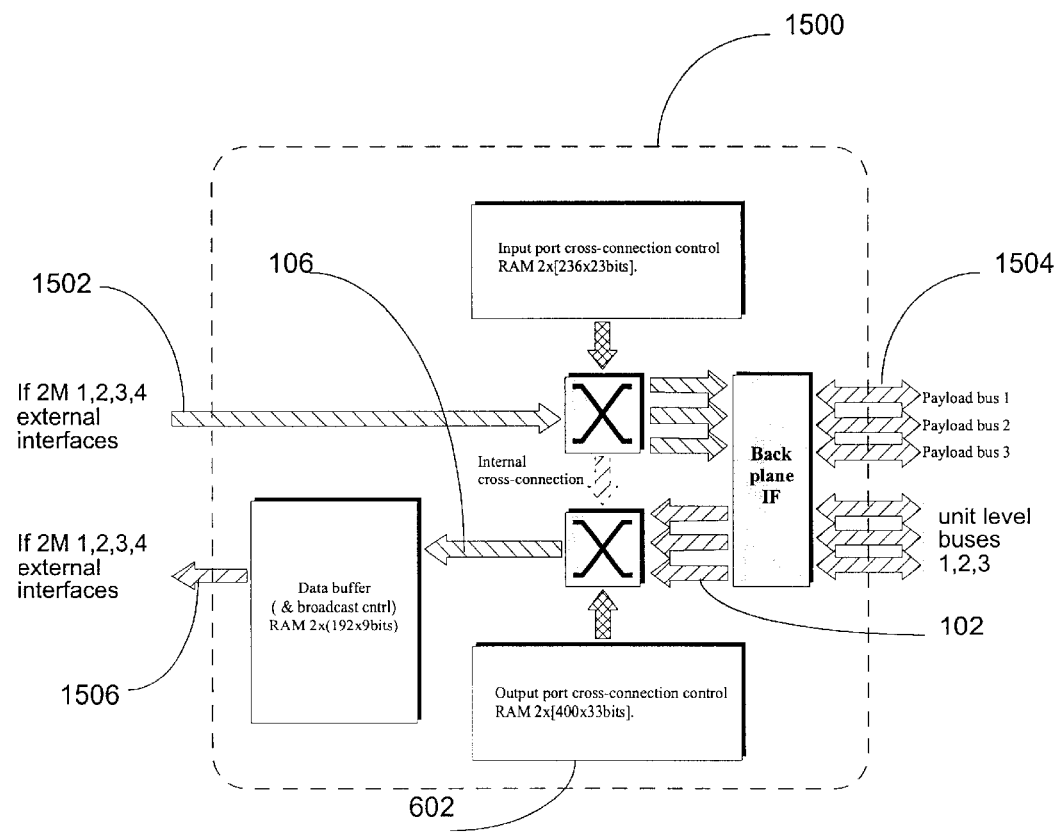
FIG. 15 depicts a cross-connection block in a second preferred embodient.

Considering FIG. 15 a cross-connection block 1500 cross-connects data streams between an input bus 1502, back plane interface bus 1504, and an output bus 1506. It is noted that the output port cross-connection control RAM 602, the input buses 102, and the output bus 106 comprise a segment of the cross-connection block 1500, this segment having been described in relation to FIG. 6. The cross-connection block 1500 connects data streams between different ports and backplane buses. The cross-connection block is divided into three parts: input port connections (only 64 kbit/s connections), output port connections (connections downto 8 kbit/s level supported for limited capacity) and the backplane interface. Input port connections specify which input port data bytes are connected to backplane payload buses and are thus merely a form of backplane resource allocation. Into output ports, data can be connected from either backplane payload buses or from some input port (ie. internal cross-connections). A backplane interface block is responsible of connecting the data between actual backplane payload buses (Payload bus 1,2,3) and unit level buses 1, 2, and 3. Both input and output port cross-connection blocks connect into unit level buses.

Input and output ports of the cross-connection block can support data from various external interfaces 1506:

Input port connections are specified in a RAM of 472×23 bits, lines of which specify one 64 kbit/s connection each. The cross-connection control RAM is divided into two parts (236 lines) both of which contain one cross-connection table. The table used for cross-connections at a certain time (ie. active cross-connection table) is selected with a select bit. For selecting an active cross-connection table, either direct control or one-shot marker based control (synchronized table change) can be used. The mode of table selection control is done with a configuration bit. When the configuration bit value is '0', the select bit is checked at the end of each frame, ie. a possible table change is executed in the first possible place according to the select bit value. If the configuration bit value equals '1', a table change is done based on the one shot information communicated in the multiframe alignment signal. When a one shot marker has been received, the status of the table select is checked (ie. the table is changed) at the end of a multiframe of the one shot marker (the one shot marker is active during the first byte of a multiframe).

An input port cross-connection control RAM line consists of three parts: enable bit, source field and target field. The source field specifies the source block and timeslot information while the target field configures the target backplane bus and timeslot for connection. Any connection can be included in the cross-connection list, but is invalidated by setting the corresponding enable bit to zero. For active connections (which are to be actually connected into backplane buses) the enable bit should be set to one. All connections are assumed to be specified in a sequential order in the control RAM i.e. according to the order in which connections are made into backplanes. Coding of source and target fields is shown in Tables 0-1 and Table 0-2.

In the source coding, the src-field indicates the main level block from where connection will be done and the timeslot selects the individual byte to be connected further.

TABLE 0-1

Coding of target fields

| bus | bus timeslot | Actual target |
|---|---|---|
| 00B | 000000000000B | Timeslots 0–3071 of backplane bus 1 |
| 01B | 000000000000B | Timeslots 0–3071 of backplane bus 2 |
| 10B | 000000000000B | Timeslots 0–3071 of backplane bus 3 |
| 11B | 000000000000B | Timeslots 0–3071 of internal cross-connections |

At the start of a new frame, the first connection is loaded from the address 0H of the control RAM. Thereafter new addresses are loaded sequentially at the rate at which connections are executed. The input port cross-connection RAM supports a constant rate of up to two connections per one backplane payload bus timeslot (24.576 MHz≈40.7 ns) and thus three connections into one system timeslot should not be specified. Three connections into one timeslot will halt connections until a new frame start (ie. only the connections before the error are executed). The connections are terminated by configuring an additional connection with a timeslot value >3071, which will halt the connection machine until new frame start.

TABLE 0-2

Coding of source field

| src | src timeslot | Actual source |
|---|---|---|
| 000B | 00000B– | Timeslot 0 of 2.048 Mbit/s interface 1 (normal connection)– |
|  | 11111B | Timeslot 31 of 2.048 Mbit/s interface 1 |
| 001B | 00000B– | Timeslot 0 of 2.048 Mbit/s interface 2 (normal connection)– |
|  | 11111B | Timeslot 31 of 2.048 Mbit/s interface 2 |
| 010B | 00000B– | Timeslot 0 of 2.048 Mbit/s interface 3 (normal connection)– |
|  | 11111B | Timeslot 31 of 2.048 Mbit/s interface 3 |
| 011B | 00000B– | Timeslot 0 of 2.048 Mbit/s interface 4 (normal connection)– |
|  | 11111B | Timeslot 31 of 2.048 Mbit/s interface 4 |
| 100B | 00000B– | Timeslot 0 of external interface 1– |
|  | 11111B | Timeslot 31 of external interface 1 |
| 101B | 00000B– | Timeslot 0 from external interface 2– |
|  | 11111B | Timeslot 31 from external interface 2 |
| 110B | 00000B– | External interface 3, byte 0– |
|  | 01000B | External interface 3, byte 8 |
|  | 01001B– | External interface 4, byte 0– |
|  | 10001B | External interface 4, byte 8 |
|  | 10010B– | Reserved– |
|  | 11111B | Reserved |
| 111B | 00000B–<br>11111B | Reserved |

Figure 16:
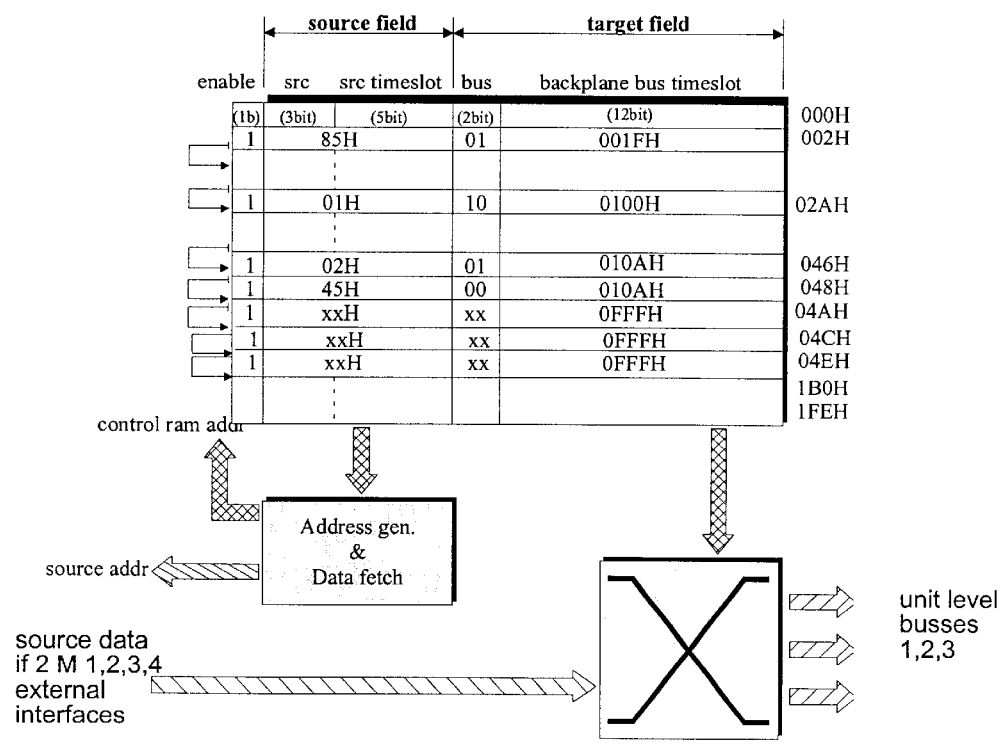
FIG. 16 illustrates an input cross-connection control RAM in the second preferred embodiment.

FIG. 16 provides an example of the contents of the input cross-connection control RAM table 0. In the example the first connection is made from a external interface 1 from timeslot 5. Fetched data is to be connected into timeslot 1FH in the backplane bus 2. The second of the shown connections (in the address 02AH) is done from the 2.048 Mbit/s interface 1, from timeslot 1 into timeslot 0100H of bus 3. In the locations 046H and 048H two connection are specified for same timeslot. The connections are to be done from the 2.048 Mbit/s interface 1 (timeslot 2) and from the 2.048 Mbit/s interface 3 (timeslot 5) into timeslot 010AH of buses 2 and 1 The list is terminated by the connection into timeslot 0FFFH.

When the input port cross-connection block connects data to the backplane it is first transmitted into a corresponding unit level bus (Payload 2 connection to unit level bus 1, etc.) from which it is transmitted further into backplane pins by a backplane interface. The backplane interface can be enabled with a backplane interface signal. In a multiple unit level bus configuration, the backplane interface should be enabled only in the chip actually connected into backplane. A connection to unit level bus can be enabled with a unit level bus signal.

In the input port connections block, data can be connected directly into the output port connections (in the present cross connection block 1500 or among interconnected chips connected by unit level buses) with a bus identification signal. When an internal connection is made, data is communicated in the unit level bus 3 which should thus not be used to transmit anything to backplane bus 3 during the timeslot in question.

For initialization purposes, the connection into some backplane buses can be disabled with one bit of an initialization register. All connections are disabled in a reset state, and before enabling connections a safe connection value should be written into the control RAM. A safe connection is, for example, some connection into timeslot >BFFH which will never be executed.

Output port connections are specified in a RAM of 800×33 bits, lines of which specify one 64 kbit/s–8 kbit/s connection each. The connection control RAM is divided into two parts (400 lines), both of which contain one cross-connection table. A table which is used for output port cross-connections (ie. active cross-connection table) is specified with an output select bit. Active table select is operated similar to that of the input port cross-connections the mode select control bit being an output configuration bit.

The structure of the output port cross-connection control RAM is similar to that of the input control RAM. A line in the output port control RAM consists of two parts, namely source and target fields. The source field specifies either a unit level bus timeslot or some internal connection timeslot (effectively same as connection from bus three; sources are specified in the input port cross-connection block) for the connection and the target field specifies the line into which data is to be written in the data buffer. The target field specifies also the type of connection to be made. As in the input port cross-connection control RAM. similarly in the output control RAM, connections are assumed to be in a sequential order. The coding of the source and target fields is shown Tables 0-3, Table 0-4 and Table 0-5.

An output port cross-connection fetches data from unit level bus timeslots (data is written either by a backplane interface block or by an input port cross-connection block) and writes rotated data into bits of buffer RAM as specified by connection type (Table 0-4). From buffer RAM, data is transmitted into outgoing data streams.

At the start of a new frame the first connection is loaded from address 0H. From thereafter new addresses are loaded sequentially at the rate connections are executed. The output port cross-connection RAM supports a constant rate of up to two connections per one backplane payload bus timeslot (24.576 MHz≈40.7 ns) and thus three connections into one system timeslot should not be specified. Three connections into one timeslot will halt connections until a new frame start (ie. only the connections before the error are executed). A resultant error is not indicated to system software. The connections are terminated by configuring an additional connection with a timeslot value >3071 which will halt the connection machine until a new frame start.

TABLE 0-3

Coding of source fields when trg bits

| trg bits | bus | bus timeslot | Actual source |
|---|---|---|---|
| ≠00H | 00B | 000000000000B– | Timeslots 0–3071 of Payload 1 |
|  | 01B | 000000000000B– | Timeslots 0–3071 of Payload 2 |
|  | 10B | 000000000000B– | Timeslots 0–3071 of Payload 3 |
|  | 11B | 000000000000B– | Timeslots 0–3071 of internal cross-connections (effectively same as bus three) |
| 00H | xxB | xxxxyyyyyyyyB | yyyyyyy specifies the constant character which is connected into the data ram buffer (primarily meant to replace the removed connection) |

TABLE 0-4

Coding of connection types

| Field | Effect |
|---|---|
| trg bits | Selects target for connected information, '1' in a certain bit position enables write to that particular position |
| rotate | trg bits ≠0H Selects the number of steps connected data is rotated before write operation Data is rotated upwards number of steps specified by this field. |

TABLE 0-4-continued

Coding of connection types

| Field | Effect |
|---|---|
| trg bits =0H | 000H - constant character connection. The eight least significant bits of timeslot specification are written into data ram buffer. 001H - 64 kbit/s digital data bridge connection, ie. only the zeros are written into ram (note that the first connection of the data bridge is assumed to be done as a normal 64 kbit/s connection) |

During internal cross-connections, data is fetched from the unit level bus 3 (data connected from input port cross-connection block).

Figure 17:
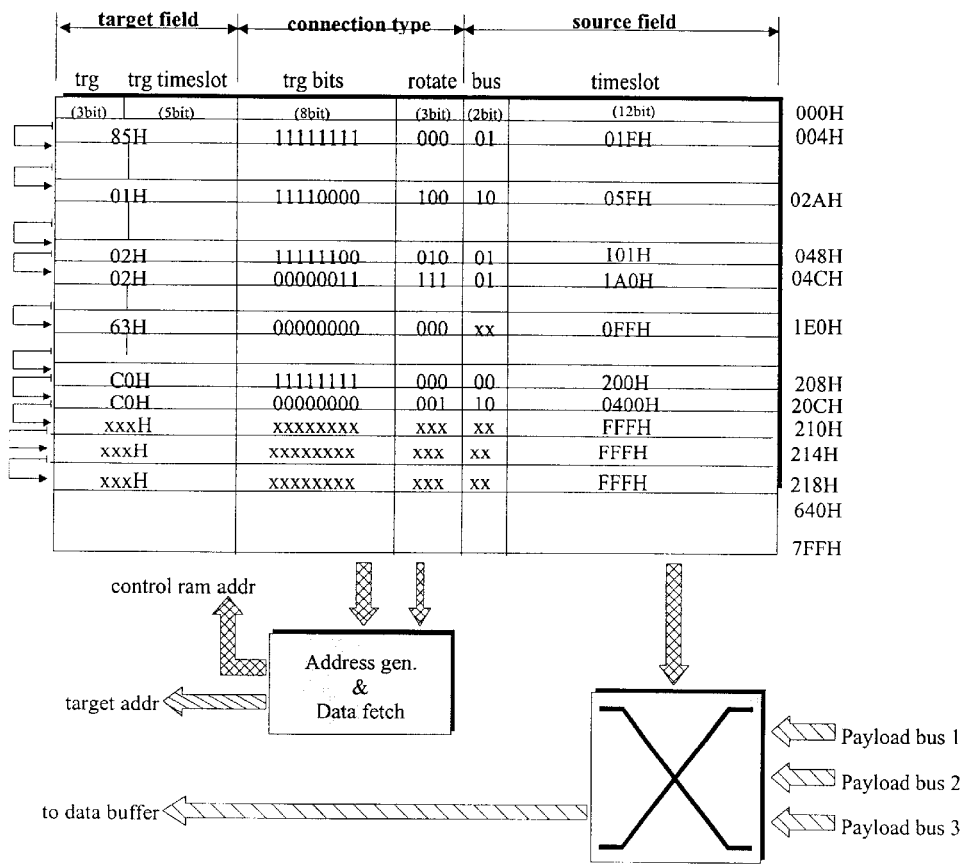
FIG. 17 depicts an output cross-connection control RAM in the second preferred embodiment.

An example of contents of the cross-connection control RAM is shown in FIG. 17. In the example, the first connection is made into the timeslot 5 of the external interface 1 from the timeslot 1FH of bus 2. The connection is a 64 kbit/s connections (all bits are enabled) with no rotation. The next of the shown connections is a 32 kbit/s level (the four most significant bits in the mask are one) connection into the timeslot 1 of 2.048 Mbit/s interface 1. The source for this connection is the least significant bits in timeslot 5FH in the bus 3 (rotation 4). The next two of the shown active connections are both targeted to the timeslot 2 of 2.048 Mbit/s interface 1. In the first connection, the six least significant bits of data from bus 2 (from timeslot 101H) are connected as the six most significant bits of the outgoing byte (mask 11111100 and rotate 2). The second connection into the outgoing byte is done from bits 3 and 2 of the timeslot 1A0H of the same bus. Bits are written as the two least significant bits (2 and 1) in the RAM (rotate value 7). The connection into timeslot 3 of the 2.048 Mbit/s interface 4 is a constant character connection (eg. the connection has just been closed). The eight lowest bits of the bus timeslot are all ones and thus all ones will be written into RAM.

The last two connections are part of a digital data bridge into External interface 3 timeslot 0. The first connection (from timeslot 0200H of bus 1) is a normal 64 kbit/s connection, while the second writes only the zeros in data into the RAM (thus effectively doing a digital summing into the data of first connection). The list is terminated by connection to timeslot 0FFFH.

TABLE 0-5

Coding of the target fields

| trg | trg timeslot | Actual target |
|---|---|---|
| 000B | 00000B– | Timeslot 0 of 2.048 Mbit/s interface 1– |
|  | 11111B | Timeslot 31 of 2.048 Mbit/s interface 1 |
| 001B | 00000B– | Timeslot 0 of 2.048 Mbit/s interface 2– |
|  | 11111B | Timeslot 31 of 2.048 Mbit/s interface 2 |
| 010B | 00000B– | Timeslot 0 of 2.048 Mbit/s interface 3– |
|  | 11111B | Timeslot 31 of 2.048 Mbit/s interface 3 |
| 011B | 00000B– | Timeslot 0 of 2.048 Mbit/s interface 4– |
|  | 11111B | Timeslot 31 of 2.048 Mbit/s interface 4 |
| 100B | 00000B– | Timeslot 0 of external interface 1– |
|  | 11111B | Timeslot 31 of external interface 1 |
| 101B | 00000B– | Timeslot 0 of external interface 2– |
|  | 11111B | Timeslot 31 of external interface 2 |
| 110B | 00000B– | External interface 3, byte 0– |
|  | 01000B | External interface 3, byte 8 |
|  | 01001B– | External interface 4, byte 0– |
|  | 10001B | External interface 4, byte 8 |
|  | 10010B– | Reserved (C2, CRC4-update procedure, timeslot 0 adaptation functions)– |
|  | 11111B | Reserved (C2) |
| 111B | xxxxxxB | Reserved (C2) |

The cross-connection data buffer stores the data written either by the output port cross-connection control logic or by the controller (constant character). A data buffer is a 408×9 bits RAM which is divided into two halves, the data of the first half is being transmitted further while the other half is being filled by output port cross-connections or system software. If a constant character is to be sent out (no cross-connection specified for some location), the data can be written bit by bit by system software using a mask register.

With an exception of timeslot 0 of 2M interfaces, the data buffer has one dedicated line for each outgoing byte. RAM lines are organized as described in the target field specification of output port cross-connection control ram (Table 0-5).

Figure 18:
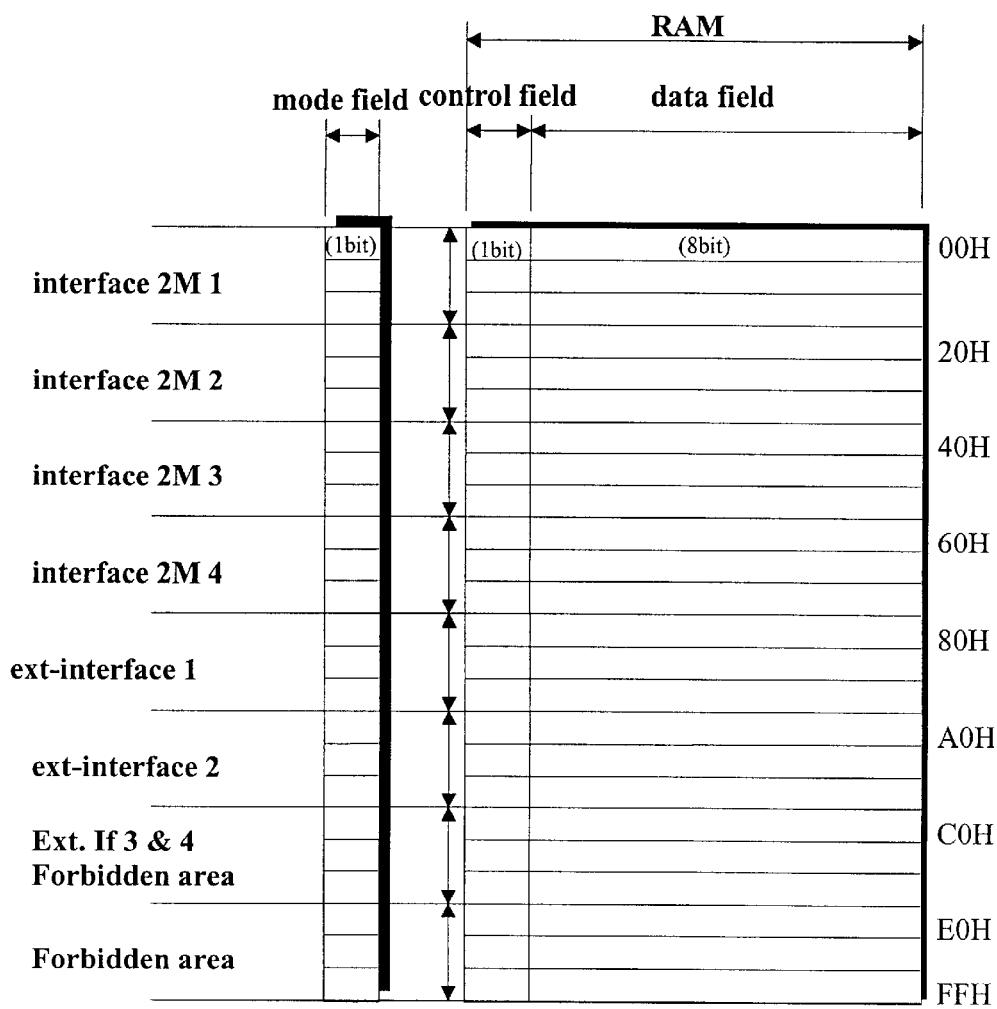
FIG. 18 shows the structure of the output data buffer in the second preferred embodiment.
Figure 19:
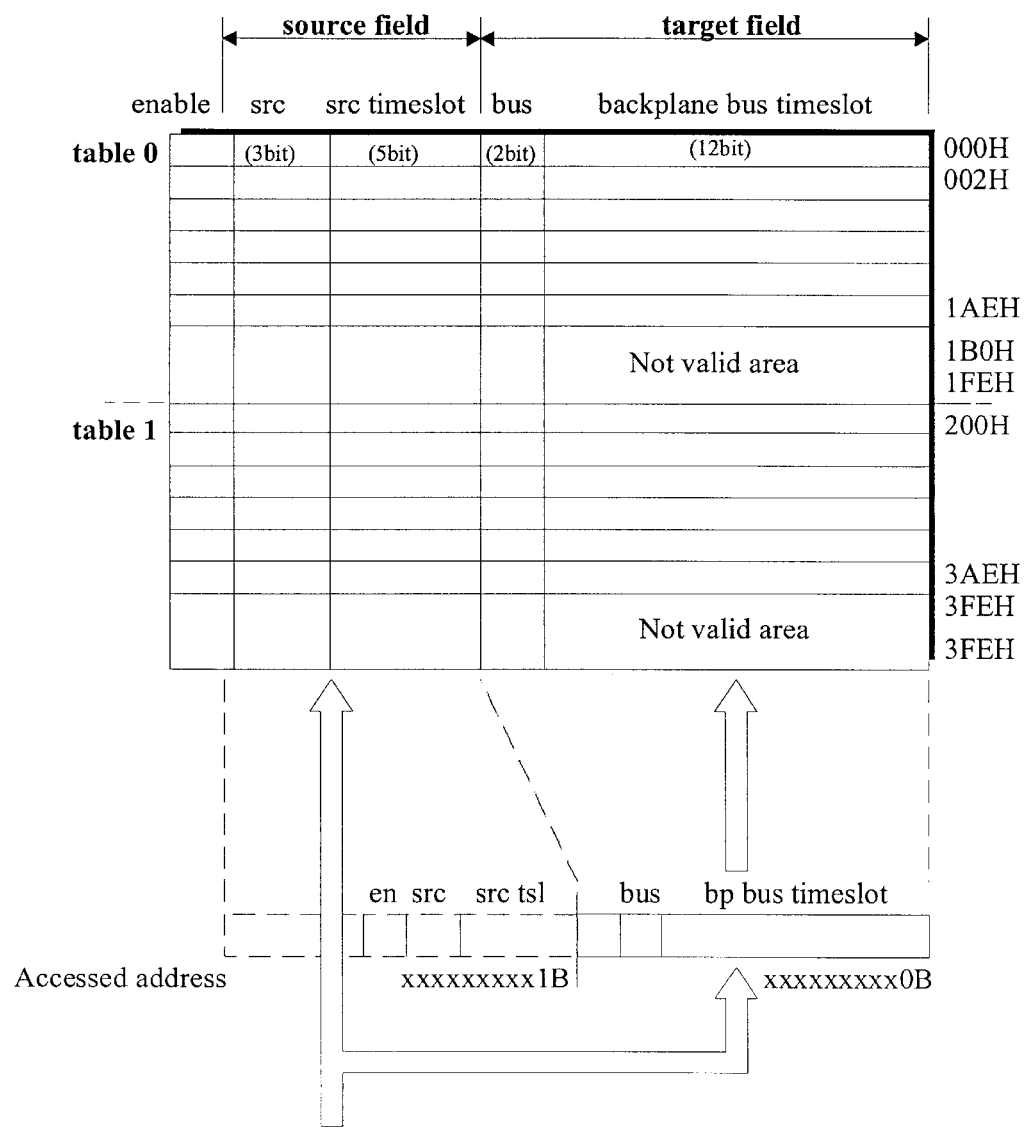
FIG. 19 illustrates the mapping and access principle for the input cross-connection control RAM in the second preferred embodiment.
Figure 20:
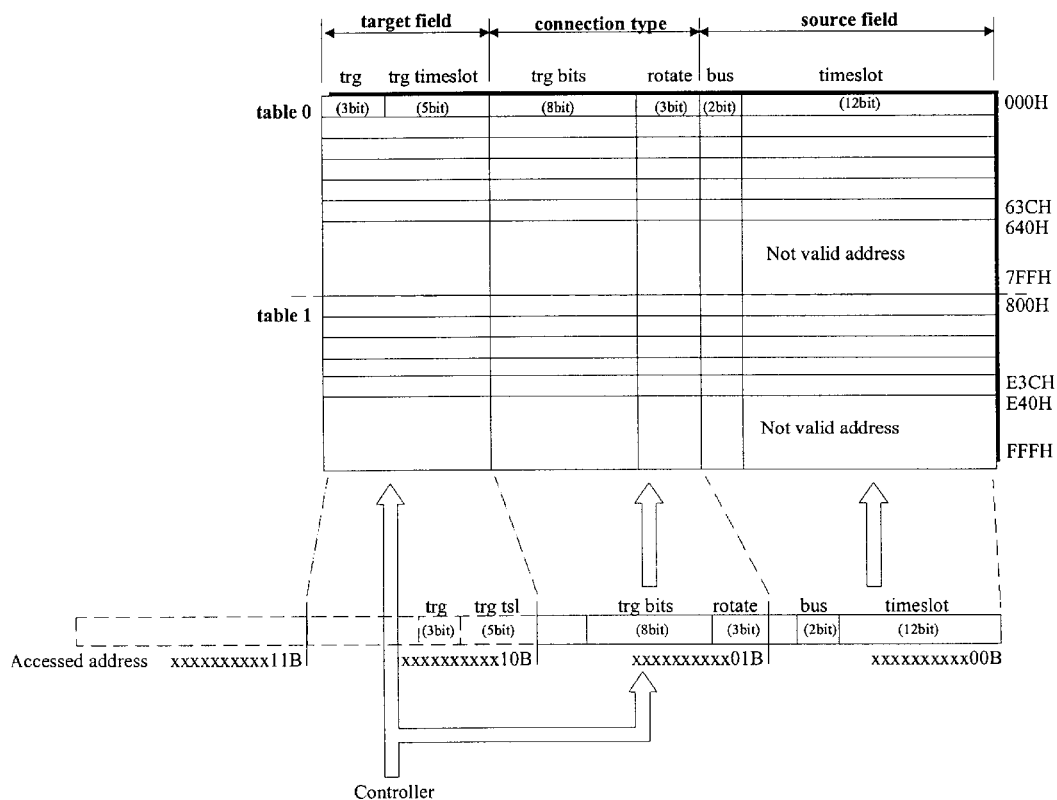
FIG. 20 illustrates the mapping and access principle for the output cross-connection control RAM in the second preferred embodiment.

A line of data buffer consists of a mode bit, a control bit and of a data part of eight bits. The mode bit specifies if the data is written only in one half or in both halves of the data buffer. The control bit specifies how the information of the data field is to be interpreted. The structure of data buffer is shown in FIG. 18, and the coding of control bit and mode bit are shown in Table 0-6 and Table 0-7.

TABLE 0-6

Coding of control bits in cross-connection data buffer

| control | Interpretation of data field |
| --- | --- |
| 0B | Data field is connected further as it is. |
| 1B | Data field is interpreted as a pointer to a location in data buffer and actual data is fetched from that address. (broadcast) |

TABLE 0-7

Coding of Mode bits in cross-connection data buffer

| Mode | Write access to databuffer RAM halves |
| --- | --- |
| 0B | Data is written to only one half of databuffer RAM: This shouldn't be used because half selection is not controlable. |
| 1B | Data is written to both halves of databuffer RAM |

All passive and active tables of the cross-connection control memories and the data RAM buffer can be accessed using a direct memory mapped access. Passive tables are edited directly when accessed by controller but active table accesses are "synchronized" into cross-connection operation, that is, table writes/reads are executed only when the accessed RAM location is not used by normal cross-connection operation.

For cross-connection control RAMs, the width of which is larger than the width of the data bus (16 bits), the row of RAM is divided into separate addresses in controller address space. In the case of input port cross-connection control RAM one line in control RAM occupies two addresses, while in the case of the output port cross-connection control RAM four addresses are reserved for one control RAM line.

The write operation into a cross-connection RAM is divided into two phases. When a cross-connection control RAM is written, actual write is triggered by a write into highest address of RAM line. The data of other write operations is stored into internal registers and stored into RAM when the data of highest (occupied) location of RAM line is written. If the data of some address line block (other than the highest location) is not accessed before next write into some highest location, previous data is used.

In read operations the word is returned from control RAM line (data selected is by RAM line "sub-address") directly without any temporary storage. The mapping of information is the same as in the case of write operations. The mapping and the principle of access into input port cross-connection control RAM and into output port cross-connection control RAM is show in FIG. 19 and FIG. 20.

The access to cross-connection data buffer is executed as a direct memory mapped write and no intermediate buffering is used. When the controller writes to an address in data RAM buffer, the actual target bits are selected by the value of the mask register. If bits in some locations are set to one, data from controller will be written into the RAM, otherwise it is ignored.

In addition to normal memory mapped access, the cross-connection data buffer supports data write to both memory halves with one controller write. In normal writes, ie. data is written only to the actual target, the 10th bit of data (the first bit outside the actual data to be written) should be set to zero. If the bit is set to one, data from controller will be written into the both halves independently of which half is specified in target address.

INDUSTRIAL APPLICABILITY

It is apparent from the above that the embodiments of the invention are applicable to the telecommunications and data processing industries.

The foregoing describes only some embodiments of the present invention, and modifications and/or changes can be made thereto without departing from the scope and spirit of the invention. The above embodiments are to be considered illustrative and not restrictive.

What is claimed is:

1. A method of cross-connecting a set of bits in a first position in a time slot in an input bus to a second position in a time slot in an output bus, the method comprising the steps of:

masking all the bits in the time slot in the input bus using a mask sub-rate field, to thereby enable only the set of bits in the first position;

shifting and rotating all the bits in the masked time slot according to a re-entrant shift-register operation, using a rotation field to establish the amount of shifting and rotating, to thereby form a group of bits conforming to the time slot in the output bus, the first set of bits having been rotated and shifted into the second position in the group of bits; and cross-connecting the group of bits to the time slot in the output bus.

2. A method according to claim 1, comprising the prior steps of:

defining a record of a cross-connection control memory means to include a connection type field comprising the mask-sub-rate field and the rotation field.

3. A method according to claim 2, whereby records in the cross-connection control memory means are processed in sequential order, said order corresponding to an order in which a series of time slots in a frame in the input bus are to be cross-connected to corresponding time slots in a corresponding frame in the output bus.

4. A method according to claim 1, whereby a width of the time slot in the input bus is one of:

larger than a width of the corresponding time slot in the output bus, smaller than the width of the corresponding time slot in the output bus, and equal to the width of the corresponding time slot in the output bus.

5. A method according to claim 1, whereby the sub-rate associated with the first set of bits and the sub-rate associated with the second set of bits are each in the region of N×8 Kb/s, N being an integer between 1 and 8.

6. A method according to claim 1, comprising the further steps of:

storing the set of bits in the second position in the group prior to the step of cross-connection.

7. A method according to claim 1, whereby the input bus and the output bus each operate substantially at 2 Mb/s.

8. A method according to claim 1, whereby cross-connecting the set of bits from the input bus to the output bus is performed at a rate of less than two connections per approximately 40.7 nsec.

9. A method of cross-connecting a set of bits in a first position in a time slot in an input bus to a second position in a time slot in an output bus, the method comprising the steps of:

shifting and rotating all the bits in the time slot in the input bus according to a re-entrant shift-register operation, using a rotation field to establish the amount of shifting and orating, thereby form a group of bits conforming to the time slot in the output bus, the first set of bits having been rotated and shifted into the second position in the group of bits;

masking all the bits in the group using a mask sub-rate field, to thereby enable only the set of bits in the second position; and cross-connecting the cross-connecting the set of bits in the second position to the time slot in the output bus.

10. A method according to claim 9, comprising the prior steps of:

defining a record of a cross-connection control memory means to include a connection type field comprising the mask sub-rate field and the rotation field.

11. A method of transferring a set of bits in a first position in a first register to a second position in a second register, the method comprising the steps of:

masking all the bits in the first register using a mask sub-rate field, to thereby enable only the set of bits in the first position;

shifting and rotating all the bits in the masked register according to a re-entrant shift-register operation, using a rotation field to establish the amount of shifting and rotating, to thereby form a group of bits conforming to the second register, the first set of bits having been rotated and shifted into the second position in the group of bits; and transferring the set group of bits to the second register.

12. A cross-connect comprising:

shifting-rotating means adapted to shift and rotate all the bits in the time slot in a input bus, according to a re-entrant shift register operation, using a rotation field to establish the amount of shifting and rotating, to thereby form a group of bits conforming to the time slot in an output bus, the bits having been rotated and shifted into a second position masking means adapted to mask the rotated and shifted bits in the group using a sub-rate mask field to thereby enable only a set of bits in the second position; and cross-connecting means adapted to cross-connect the masked set of bits to the time slot in an output bus.

13. A cross-connect comprising:

masking means adapted to mask all the in a time slot bits in an input bus using a mask sub-rate field to thereby enable only a set of bits in a first position in the time slot in the input bus;

shifting-rotating means adapted to shift and rotate all the bits in the masked time slot, according to a re-entrant shift register operation, using a rotation field to establish the amount of shifting and rotating, to thereby form a group of bits conforming to the time slot in the output bus, the first set of bits having been rotated and shifted into the second position in the group of bits; and cross-connecting means adapted to cross-connect the group of bits to the time slot in the output bus.

14. An apparatus according to claim 13, further comprising:

defining means adapted to define a record of a cross-connection control memory means to include a connection type field comprising the mask sub-rate field and the rotation field.

15. A cross-connect according to claim 14, whereby the cross-connection control memory means comprises two memory regions, one or other region being active at a time.

16. An apparatus according to claim 13, further comprising:

defining means adapted to define a record of a cross-connection control memory means to include a connection type field comprising the mask sub-rate field and the rotation field.

17. An apparatus according to claim 13, wherein the means for masking, shifting-rotating and cross-connecting are adapted to cross-connect the set of bits from the input bus to the output bus at bit rates in the region of N×8 Kb/s, N being an integer between 1 and 8.

18. A cross-connect system including:

input means adapted to receive data disposed in time-slots of frames on an input bus;

output means adapted to transmit cross-connected data disposed in corresponding time-slots of frames on an output bus;

cross-connection control memory means adapted to store coded records which define one or more first sub-rates in the input bus time slots to be cross-connected to one or more second sub-rates in the corresponding time slots in the output bus; and at least one cross-connect according to claim 12 adapted to cross-connect the one or more first sub-rates in the input bus to the one or more second sub-rates in the output bus in accordance with the coded records.

* * * * *